US006509062B2

(12) United States Patent
Nakata et al.

(10) Patent No.: US 6,509,062 B2
(45) Date of Patent: Jan. 21, 2003

(54) ELASTOMER DELUSTERING METHOD

(75) Inventors: Toshiki Nakata, Chiba (JP); Masayuki Onishi, Chiba (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 3 days.

(21) Appl. No.: 09/824,695

(22) Filed: Apr. 3, 2001

(65) Prior Publication Data

US 2002/0045013 A1 Apr. 18, 2002

(30) Foreign Application Priority Data

Apr. 25, 2000 (JP) .......................... 2000-124426

(51) Int. Cl.$^7$ .......................... B05D 5/02; C08F 283/12
(52) U.S. Cl. .................. 427/340; 427/337; 427/421; 427/430.1; 427/170; 428/141; 428/409; 428/447; 525/326.1; 525/326.5; 525/479
(58) Field of Search .......................... 525/326.1, 326.5, 525/479; 428/141, 409, 447; 427/337, 340, 170, 421, 430.1

(56) References Cited

U.S. PATENT DOCUMENTS

| | | | |
|---|---|---|---|
| 3,797,690 A | 3/1974 | Taylor et al. | |
| 4,100,124 A | * 7/1978 | Ichikawa et al. | 524/730 |
| 4,659,596 A | 4/1987 | Karim | |
| 5,338,574 A | * 8/1994 | O'Neil et al. | 427/377 |
| 5,777,026 A | * 7/1998 | Berg et al. | 524/457 |
| 6,027,788 A | * 2/2000 | Hagen | 428/141 |

FOREIGN PATENT DOCUMENTS

EP  0985710 A1  3/2000

OTHER PUBLICATIONS

Engligh Abstract of JP 6–269,727, Sep. 1994, assigned to Nissan Motor Co Ltd.*

English Abstract of JP 8–057,410, Mar. 1996, assigned to EIDAI CO LTD.*

English Abstract of JP 10–256,261, Sep. 1998, Hashimoto.*

Engligh Abstract of JP 10–278,537, Oct. 1998, assigned to Calsonic Corp.*

* cited by examiner

Primary Examiner—Robert Dawson
Assistant Examiner—Jeffrey B. Robertson
(74) Attorney, Agent, or Firm—Larry A. Milco; Catherine U. Brown

(57) ABSTRACT

An elastomer delustering method comprising impregnating the surface of an elastomer with an organic compound having air-oxidizable curable unsaturated groups.

12 Claims, No Drawings

ELASTOMER DELUSTERING METHOD

FIELD OF THE INVENTION

The present invention relates to an elastomer delustering method and more particularly to a method for efficiently delustering an elastomer that either is initially devoid of delustering properties or has inadequate delustering properties.

BACKGROUND OF THE INVENTION

Examples of methods for forming delusterant elastomers include methods for curing silicone elastomer compositions containing delustering inorganic fillers and methods for curing silicone elastomer compositions containing organic compounds having air-oxidizable/curable unsaturated groups as disclosed in Japanese Patent Application Laying Open No. 2000-80276 and 2000-86896.

In addition, a surface roughening technique such as that proposed in Japanese Patent Application Laying Open No. Hei 6-269727 and a technique for applying delustering coatings having glass spherules such as that proposed in Japanese Patent Application Laying Open No. Hei 8-57410 are known as methods for improving the delustering properties of such elastomers or imparting delustering properties to elastomers originally devoid of delustering properties.

However, the techniques disclosed in Japanese Patent Application Laying Open No. Hei 6-269727 and 8-57410 are disadvantageous in that the appearance of the elastomer surface is adversely affected or that the newly formed delustering coatings peel off because of inadequate affinity for the elastomers.

Specifically, an object of the present invention is to provide a method for efficiently delustering an elastomer that either is initially devoid of delustering properties or has inadequate delustering properties.

SUMMARY OF THE INVENTION

The present invention is an elastomer delustering method comprising impregnating the surface of an elastomer with an organic compound having air-oxidizable curable unsaturated groups.

DESCRIPTION OF THE INVENTION

The present invention is an elastomer delustering method comprising impregnating the surface of an elastomer with an organic compound having air-oxidizable curable unsaturated groups. The elastomer used in the present method can be any rubber or gel product that can be impregnated with an organic compound having air-oxidizable and/or curable unsaturated groups or a solution thereof. Specific examples of such elastomers include EPDM, butyl rubber, polybutadiene rubber, fluororubber, polyurethane, silicone rubber, and silicone gel, of which silicone rubber and silicone gel are preferred. The silicone rubber and silicone gel used herein are not limited in any way and include products obtained by curing silicone compositions of the addition reaction curing type, products obtained by curing silicone compositions of the condensation reaction curing type, products obtained by curing silicone compositions of the addition reaction and condensation reaction curing type, products obtained by curing silicone compositions of the peroxide curing type, and products obtained by curing silicone compositions of the UV curing type. In particular, surface adhesion can be reduced when silicone gel elastomers are used.

The organic compound having air-oxidizable curable unsaturated groups that is used in accordance with the present method is a component designed to impregnate and deluster the elastomer surface. The organic compound is one in which the unsaturated groups in the molecules are cured by the oxygen in air. Specific examples include linolenic acid, linolic acid, and other unsaturated higher fatty acids; tung oil, linseed oil, soybean oil, and other oils and fats consisting of esters of glycerin and unsaturated higher fatty acids; methyl linolenate, methyl linoleate, and other esters of alcohols with unsaturated higher fatty acids; and butadiene, pentadiene, hexadiene, 2,6-dimethyl-2,4,6-octatriene, and other unsaturated hydrocarbon compounds or polymers thereof, of which linolenic acid, methyl linolenate, tung oil, 1,3-hexadiene, 1,4-polybutadiene, and 2,6-dimethyl-2,4,6-octatriene are preferred.

Although using an organic solvent in the present method is optional, such use becomes obligatory when, for example, the elastomer surface is difficult to impregnate using the organic compound as such. In such case, a solution containing 1 to 10 wt % of the organic compound should preferably be prepared. Any organic solvent capable of causing elastomer swelling can be used. Examples include hexane, heptane, octane, decane, and other aliphatic hydrocarbons; toluene, xylene, and other aromatic hydrocarbons; ethyl acetate, butyl acetate, and other esters; THF and other ethers; chloroform, carbon tetrachloride, dichloromethane, and other halogenated hydrocarbons; and low-viscosity silicone oils such as dimethylsiloxane oligomers (e. g. hexamethyldisiloxane and octamethyltrisiloxane) and cyclic dimethylsiloxanes (e.g. octamethylcyclotrisiloxane, tetramethylcyclotetrasiloxane, tetramethyltetravinylcyclotetrasiloxane, and decamethylcyclopentasiloxane); as well as gasoline and rubber naphtha.

Antioxidants such as hydroquinone and eugenol and curing accelerators such as cobalt naphthenate, lead naphthenate, and manganese naphthenate can be optionally used together with the aforementioned organic compounds in the present method.

Examples of techniques for impregnating an elastomer surface with an organic compound having air-oxidizable curable unsaturated groups include techniques in which the elastomer is immersed in the organic compound or a solution thereof, techniques in which the elastomer is sprayed with the organic compound or a solution thereof, and techniques in which the organic compound or a solution thereof is applied to the elastomer with a brush. The amounts used for the treatment are not limited in any way and is selected such that the elastomer surface is impregnated with the organic compound and provided with adequate delustering properties. Any organic compound or organic compound solution remaining on the elastomer surface should preferably be washed away with an organic solvent and wiped off with paper or the like.

According to the present method the elastomer surface can be delustered by a technique in which the elastomer treated with the organic compound is held or heated in the presence of oxygen, specifically in air. To adequately deluster the elastomer surface it is preferable to adopt an approach in which the elastomer is allowed to stand, for example, for 3 to 7 days in air at room temperature.

With the method of the present invention it is possible to impart adequate delustering properties to an elastomer initially devoid of delustering properties or an elastomer whose delustering properties are below expectations. This method is therefore useful for making elastomers more aesthetically appealing or improving the quality of delustered elastomers. This method is also useful as a detackifying technique because it reduces the surface adhesion of gel-like elastomers.

WORKING EXAMPLES

The present elastomer delustering method will now be described in further detail through working examples. In the working examples, viscosity is a value obtained at 25° C. The delustering properties of an elastomer were evaluated by measuring the glossiness of the elastomer by the glossiness measuring method defined in JIS Z 8741 (measurement angle=60°).

Reference Example 1

A dimethylpolysiloxane in which both ends of the molecular chains were blocked with dimethylvinylsiloxy groups and which had a viscosity of 2000 mPa·s, a dimethylpolysiloxane in which both ends of the molecular chains were blocked with trimethoxysiloxy groups and which had a viscosity of 500 mPa·s, and carbon black were uniformly mixed in amounts of 75 weight parts, 25 weight parts, and 5 weight parts, respectively; and an isopropyl alcohol solution of chloroplatinic acid (the chloroplatinic acid was added such that the amount of platinum metal was 0.001 wt % in relation to the aforementioned dimethylpolysiloxane in which both ends of the molecular chains were blocked with dimethylvinylsiloxy groups), 1 weight part zirconium acetyl acetonate, and 7 weight parts of a dimethylpolysiloxane in which both ends of the molecular chains were blocked with dimethylhydrogensiloxy groups and which had a viscosity of 10 mPa·s were then mixed, yielding a silicone rubber composition of the addition reaction/condensation reaction curing type. Silicone rubber sheet (A) was then obtained by curing the composition at 80° C. for 2 hours. The sheet had a glossiness value of 90.

Reference Example 2

A dimethylpolysiloxane in which both ends of the molecular chains were blocked with trimethoxysiloxy groups and which had a viscosity of 15,000 mPa·s, and fumed silica with a BET specific surface area of 200 m$^2$/g surface-treated with hexamethyldisilazane were uniformly mixed in amounts of 100 weight parts and 10 weight parts, respectively; and 2 weight parts diisopropoxybis(ethyl acetoacetate)titanium and 2 weight parts methyltrimethoxysilane were then mixed, yielding a silicone rubber composition of the condensation reaction curing type. Silicone rubber sheet (B) was then obtained by curing the composition for 1 week at room temperature. The sheet had a glossiness value of 82.

Reference Example 3

An organopolysiloxane mixture having a viscosity of 7000 mPa·s and comprising, first a dimethylpolysiloxane in which both ends of the molecular chains were blocked with dimethylvinylsiloxy groups and which had a viscosity of 2000 mPa·s, and second an organopolysiloxane copolymer containing 57 mol % SiO$_2$ units, 40.5 mol % (CH$_3$)$_3$SiO$_{1/2}$ units, and 2.5 mol % (CH$_3$)$_2$(CH$_2$=CH)SiO$_{1/2}$ units was uniformly mixed in an amount of 100 weight parts with 50 weight parts of pulverized silica with a mean particle size of 5 μm; and a copolymer of methylhydrogensiloxane and a dimethylsiloxane in which both ends of the molecular chains were blocked with trimethylsiloxy groups and which had a viscosity of 5 mPa·s (molar ratio of dimethylsiloxane units and methylhydrogensiloxane units was 3:5) was then mixed in an amount of 6 weight parts with an isopropyl alcohol solution of chloroplatinic acid (the chloroplatinic acid was added such that the amount of platinum metal was 0.001 wt % in relation to the aforementioned dimethylpolysiloxane mixture), yielding a silicone rubber composition of the addition reaction curing type. Silicone rubber sheet (C) was then obtained by curing the composition at 120° C. for 1 hour. The sheet had a glossiness value of 33.

Reference Example 4

An organopolysiloxane having a viscosity of 800 mPa·s, containing 0.22 wt % vinyl groups, and comprising 94 mol % (CH$_3$)$_2$SiO$_{2/2}$ units, 3.3 mol % CH$_3$SiO$_{3/2}$ units, 2 mol % (CH$_3$)$_3$SiO$_{1/2}$ units, and 0.7 mol % (CH$_3$)$_2$(CH$_2$=CH)SiO$_{1/2}$ units was mixed in an amount of 100 weight parts with an isopropyl alcohol solution of chloroplatinic acid (the chloroplatinic acid was added such that the amount of platinum metal was 0.001 wt % in relation to the aforementioned organopolysiloxane) and 6.6 weight parts of a dimethylpolysiloxane in which both ends of the molecular chains were blocked with dimethylhydrogensiloxy groups and which had a viscosity of 10 mPa·s, yielding a silicone gel composition of the addition reaction curing type. Silicone gel sheet (D) was then obtained by curing the composition at 70° C. for 1 hour. The sheet had a glossiness value of 82.

Working Example 1

The silicone rubber sheet (A) obtained in Reference Example 1 was immersed for 30 seconds in a 5 wt % n-hexane solution of tung oil and the excess solution deposited on the surface was wiped off with paper. The sheet was subsequently allowed to stand for 1 week at room temperature. Sheet glossiness was then measured and found to be a value of 0, indicating that adequate delustering had been attained.

Working Example 2

The silicone rubber sheet (A) obtained in Reference Example 1 was immersed for 30 seconds in a 1 wt % n-hexane solution of tung oil and the excess solution deposited on the surface was wiped off with paper. The sheet was subsequently allowed to stand for 1 week at room temperature. Sheet glossiness was then measured and found to be a value of 11, indicating that adequate delustering had been attained.

Working Example 3

The silicone rubber sheet (A) obtained in Reference Example 1 was immersed for 30 seconds in a 50 wt % n-hexane solution of tung oil and the excess solution deposited on the surface was wiped off with paper. The sheet was subsequently allowed to stand for 1 week at room temperature. Sheet glossiness was then measured and found to be a value of 15, indicating that adequate delustering had been attained.

Working Example 4

The silicone rubber sheet (A) obtained in Reference Example 1 was immersed for 30 seconds in a 5 wt % n-decane solution of tung oil and the excess solution deposited on the surface was wiped off with paper. The sheet was subsequently allowed to stand for 1 week at room temperature. Sheet glossiness was then measured and found to be a value of 17, indicating that adequate delustering had been attained.

Working Example 5

The silicone rubber sheet (A) obtained in Reference Example 1 was immersed for 30 seconds in a 5 wt % hexamethyldisiloxane solution of tung oil and the excess solution deposited on the surface was wiped off with paper. The sheet was subsequently allowed to stand for 1 week at room temperature. Sheet glossiness was then measured and found to be a value of 5, indicating that adequate delustering had been attained.

Working Example 6

The silicone rubber sheet (A) obtained in Reference Example 1 was immersed for 10 minutes in a 5 wt % n-hexane solution of tung oil and the excess solution deposited on the surface was wiped off with paper. The sheet was subsequently allowed to stand for 1 week at room temperature. Sheet glossiness was then measured and found to be a value of 0, indicating that adequate delustering had been attained.

Working Example 7

The silicone rubber sheet (A) obtained in Reference Example 1 was sprayed with a 5 wt % n-hexane solution of tung oil from a hand spray and allowed to stand for 1 week at room temperature. Sheet glossiness was then measured and found to be a value of 3, indicating that adequate delustering had been attained.

Working Example 8

The silicone rubber sheet (B) obtained in Reference Example 2 was immersed for 30 seconds in a 5 wt % n-hexane solution of tung oil and the excess solution deposited on the surface was wiped off with paper. The sheet was subsequently allowed to stand for 1 week at room temperature. Sheet glossiness was them measured and found to be a value of 3, indicating that adequate delustering had been attained.

Working Example 9

The silicone rubber sheet (C) obtained in Reference Example 3 was brushed with 2,6-dimethyl-2,4,6-octatriene and allowed to stand for 1 week at room temperature. Sheet glossiness was then measured and found to be a value of 9, indicating that adequate delustering had been attained.

Working Example 10

The silicone gel sheet (D) obtained in Reference Example 4 was immersed for 30 seconds in a 5 wt % toluene solution of tung oil and the excess solution deposited on the surface was wiped off with paper. The sheet was subsequently allowed to stand for 1 week at room temperature. Sheet glossiness was them measured and found to be a value of 4, indicating that adequate delustering had been attained. It was also confirmed that the silicone gel sheet possessed reduced surface adhesiveness.

Comparative Example 1

The silicone rubber sheet (A) obtained in Reference Example 1 was immersed for 30 seconds in n-hexane and the excess n-hexane deposited on the surface was wiped off with paper. The sheet was subsequently allowed to stand for 1 week at room temperature. Sheet glossiness was then measured and found to be a value of 87, indicating that no delustering had occurred.

Comparative Example 2

The silicone rubber sheet (B) obtained in Reference Example 2 was immersed for 30 seconds in n-hexane and the excess n-hexane deposited on the surface was wiped off with paper. The sheet was subsequently allowed to stand for 1 week at room temperature. Sheet glossiness was then measured and found to be a value of 80, indicating that no delustering had occurred.

Comparative Example 3

The silicone gel sheet (D) obtained in Reference Example 4 was immersed for 30 seconds in toluene and the excess toluene deposited on the surface was wiped off with paper. The sheet was subsequently allowed to stand for 1 week at room temperature. Sheet glossiness was then measured and found to be a value of 82, indicating that no delustering had occurred. It was also confirmed that the surface adhesiveness of the silicone gel sheet had remained unchanged.

What is claimed is:

1. An elastomer delustering method comprising:
   (1) impregnating the surface of a silicone elastomer with an organic compound having air-oxidizable curable unsaturated groups, where step (1) is carried out by a technique comprising techniques in which the elastomer is immersed in the organic compound or a solution thereof, techniques in which the elastomer is sprayed with the organic compound or a solution thereof, and techniques in which the organic compound or a solution thereof is applied to the elastomer with a brush; and
   (2) holding or heating the product of step (1) in the presence of oxygen, thereby delustering the silicone elastomer.

2. A method comprising:
   (1) impregnating the surface of a silicone gel with an organic compound having air-oxidizable curable unsaturated groups; and
   (2) holding or heating the product of step (1) in the presence of oxygen, thereby delustering the silicone gel and reducing surface adhesion of the silicone gel.

3. An elastomer delustering method according to claim 1, where the elastomer is a silicone gel.

4. An elastomer delustering method according to claim 1, where the organic compound is selected from the group consisting of linolenic acid, methyl linolenate, tung oil, 1,3-hexadiene, 1,4-polybutadiene, and 2,6-dimethyl-2,4,6-octatriene.

5. An elastomer delustering method according to claim 1, where the organic compound is tung oil.

6. An elastomer delustering method according to claim 1 further comprising a curing accelerator selected from the group consisting of cobalt naphthenate, lead naphthenate, and manganese naphthenate.

7. An elastomer delustering method according to claim 1 further comprising a curing accelerator for the air-oxidizable curable unsaturated groups of the organic compound.

8. An elastomer delustering method according to claim 1, where the organic compound is in solution in an organic solvent.

9. The method of claim 1, where the organic compound is selected from the group consisting of unsaturated higher fatty acids, oils and fats consisting of esters of glycerin and unsaturated higher fatty acids, esters of alcohols with unsaturated higher fatty acids, unsaturated hydrocarbon compounds or polymers thereof.

10. The method of claim 1, further comprising washing away any organic compound or organic compound solution remaining on the elastomer surface with an organic solvent and wiping off the elastomer after step (1).

11. The method of claim 1, where step (2) is carried out by allowing the elastomer to stand for 3 to 7 days in air at room temperature.

12. The method of claim 1, where the silicone elastomer is selected from the group consisting of a silicone rubber sheet and a silicone gel sheet.

* * * * *